(12) United States Patent
Chung

(10) Patent No.: US 7,605,491 B1
(45) Date of Patent: Oct. 20, 2009

(54) APPARATUS FOR GENERATING ELECTRIC POWER USING WIND ENERGY

(76) Inventor: Chun-Neng Chung, No. 656, Jhongyuan Lane, Jhuwei Village, Neipu Township, Pingtung County (TW)

( * ) Notice: Subject to any disclaimer, the term of this patent is extended or adjusted under 35 U.S.C. 154(b) by 0 days.

(21) Appl. No.: 12/125,348

(22) Filed: May 22, 2008

(51) Int. Cl.
*F03D 9/00* (2006.01)
*H02P 9/04* (2006.01)

(52) U.S. Cl. .......................................... 290/55; 290/44

(58) Field of Classification Search .................. 290/44, 290/54, 55; 415/4.2, 2.1, 7, 905; 60/398; 416/132 B, 7

See application file for complete search history.

(56) References Cited

U.S. PATENT DOCUMENTS

| | | | | |
|---|---|---|---|---|
| 1,441,774 A | * | 1/1923 | Adams | 415/162 |
| 3,938,907 A | * | 2/1976 | Magoveny et al. | 415/141 |
| 4,012,163 A | * | 3/1977 | Baumgartner et al. | 415/208.3 |
| 4,494,007 A | * | 1/1985 | Gaston | 290/44 |
| 5,447,412 A | * | 9/1995 | Lamont | 415/4.2 |
| 5,977,649 A | * | 11/1999 | Dahill | 290/55 |
| 6,015,258 A | * | 1/2000 | Taylor | 415/4.4 |
| 7,242,108 B1 | * | 7/2007 | Dablo | 290/55 |
| 7,436,086 B2 | * | 10/2008 | McClintic | 290/55 |
| 2004/0100103 A1 | * | 5/2004 | Becherucci et al. | 290/55 |
| 2004/0183310 A1 | * | 9/2004 | Mowll | 290/55 |
| 2005/0151376 A1 | * | 7/2005 | Bernhoff et al. | 290/44 |

* cited by examiner

*Primary Examiner*—Julio C. Gonzalez
(74) *Attorney, Agent, or Firm*—Christie, Parker & Hale, LLP

(57) ABSTRACT

An apparatus for generating electric power from wind energy includes: a blade unit having upright blades connected fixedly to an upright rod that has a lower end disposed pivotally in a base such that the blade unit is rotatable relative to the base so as to convert wind energy into a mechanical rotary power output; a generator disposed in the base and coupled to the lower end of the upright rod to convert the mechanical rotary power output into electric power; and a wind-collecting cover mounted pivotally on the base for covering the blade unit, rotatable relative to the base and formed with opposite wind inlet and outlet. The wind-collecting cover rotates in response to blowing of wind thereto so that the wind flows into an inner space in the cover via the wind inlet and out of the inner space in the cover via the wind outlet.

5 Claims, 7 Drawing Sheets

APPARATUS FOR GENERATING ELECTRIC POWER USING WIND ENERGY

BACKGROUND OF THE INVENTION

1. Field of the Invention

The invention relates to an apparatus for generating electric power from wind energy.

2. Description of the Related Art

Referring to FIG. 1, a conventional apparatus 1 for generating electric power from wind energy is shown to include a windmill 12 and a generator 13. The windmill 12 includes an upright prop 121 mounted fixedly on a supporting surface (not shown), and a wind impeller 122 having a plurality of blades. The windmill 12 converts wind energy into a mechanical rotary power output. The generator 13 is coupled to the windmill 12 to convert the mechanical rotary power into electric power.

The following are some of the drawbacks of the conventional apparatus 1:

1. A height of the prop 121 of the windmill 12 is about 70 meters, and a length of each blade of the wind impeller 122 of the windmill 12 is about 35 meters, thereby resulting in a relatively large space requirement. Therefore, the conventional apparatus 1 has to be located at a remote place far from a densely populated area, thereby resulting in inconvenience during implementation.

2. The arrangement of the conventional apparatus 1 cannot ensure stable electric generation for an area having wind from various directions.

SUMMARY OF THE INVENTION

Therefore, an object of the present invention is to provide an apparatus for generating electric power using wind energy that can overcome the aforesaid drawbacks of the prior art.

According to the present invention, there is provided an apparatus for generating electric power from wind energy. The apparatus comprises:

a base;

a blade unit including an upright rod extending vertically along a pivot axis and having a lower end disposed pivotally in the base, and an upper end, and a plurality of upright blades connected fixedly to the upright rod such that the blade unit is rotatable relative to the base about the pivot axis so as to convert wind energy into a mechanical rotary power output;

a generator disposed in the base and coupled to the lower end of the upright rod of the blade unit to convert the mechanical rotary power output into electric power; and a wind-collecting cover mounted pivotally on the base for covering the blade unit such that the wind-collecting cover is rotatable relative to the base about the pivot axis, the wind-collecting cover being configured with an inner space, and having a first end portion formed with a wind inlet in spatial communication with the inner space, and a second end portion opposite to the first end portion in a direction perpendicular to the pivot axis and formed with a wind outlet in spatial communication with the inner space and having a size smaller than that of the wind inlet in the first end portion.

The wind-collecting cover rotates in response to blowing of wind thereto so that the wind flows into the inner space in the wind-collecting cover via the wind inlet to drive rotation of the blade unit and out of the inner space in the wind-collecting cover via the wind outlet.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
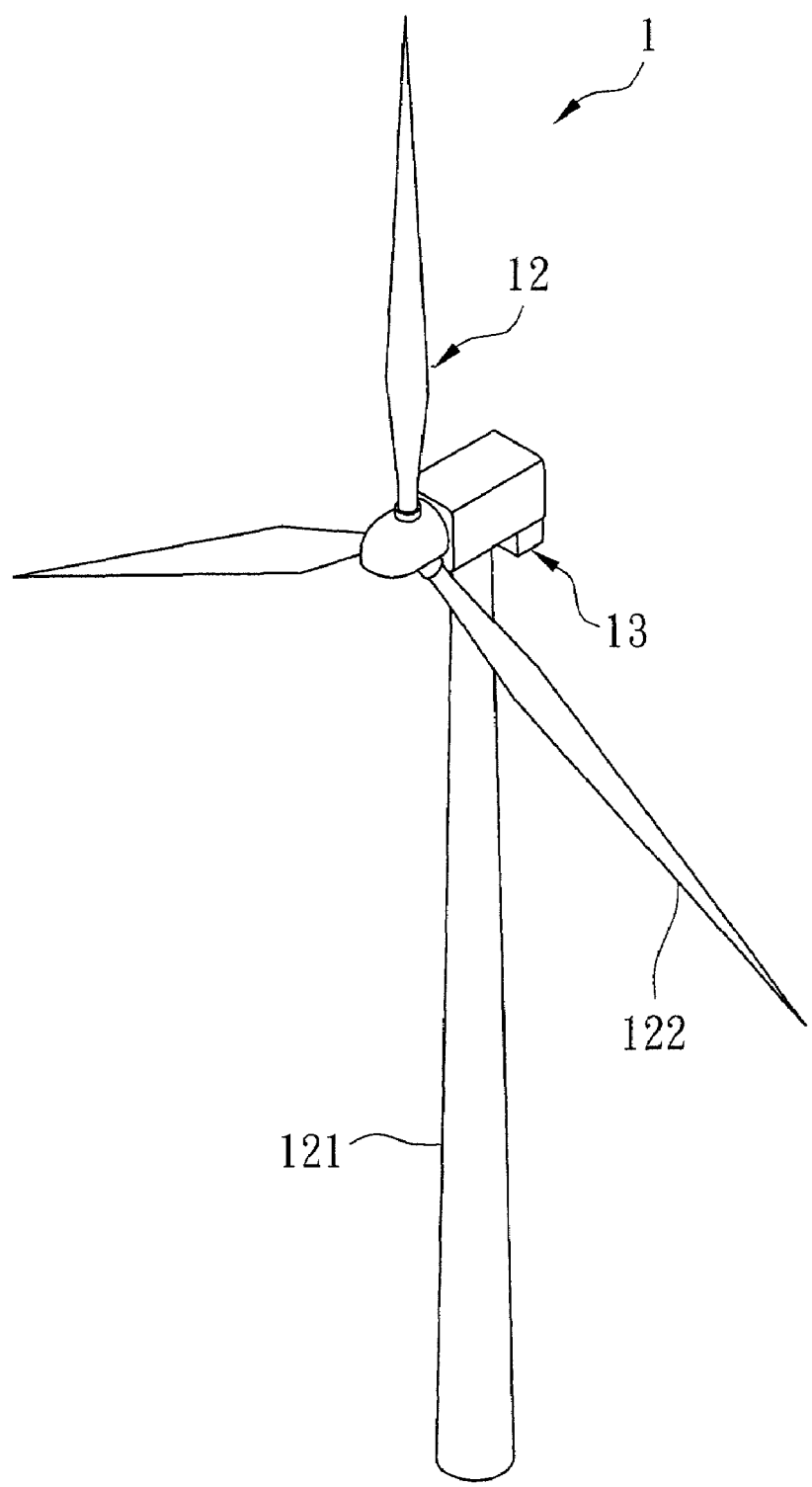
FIG. 1 is a perspective view of a conventional apparatus for generating electric power using wind energy.
Figure 2:
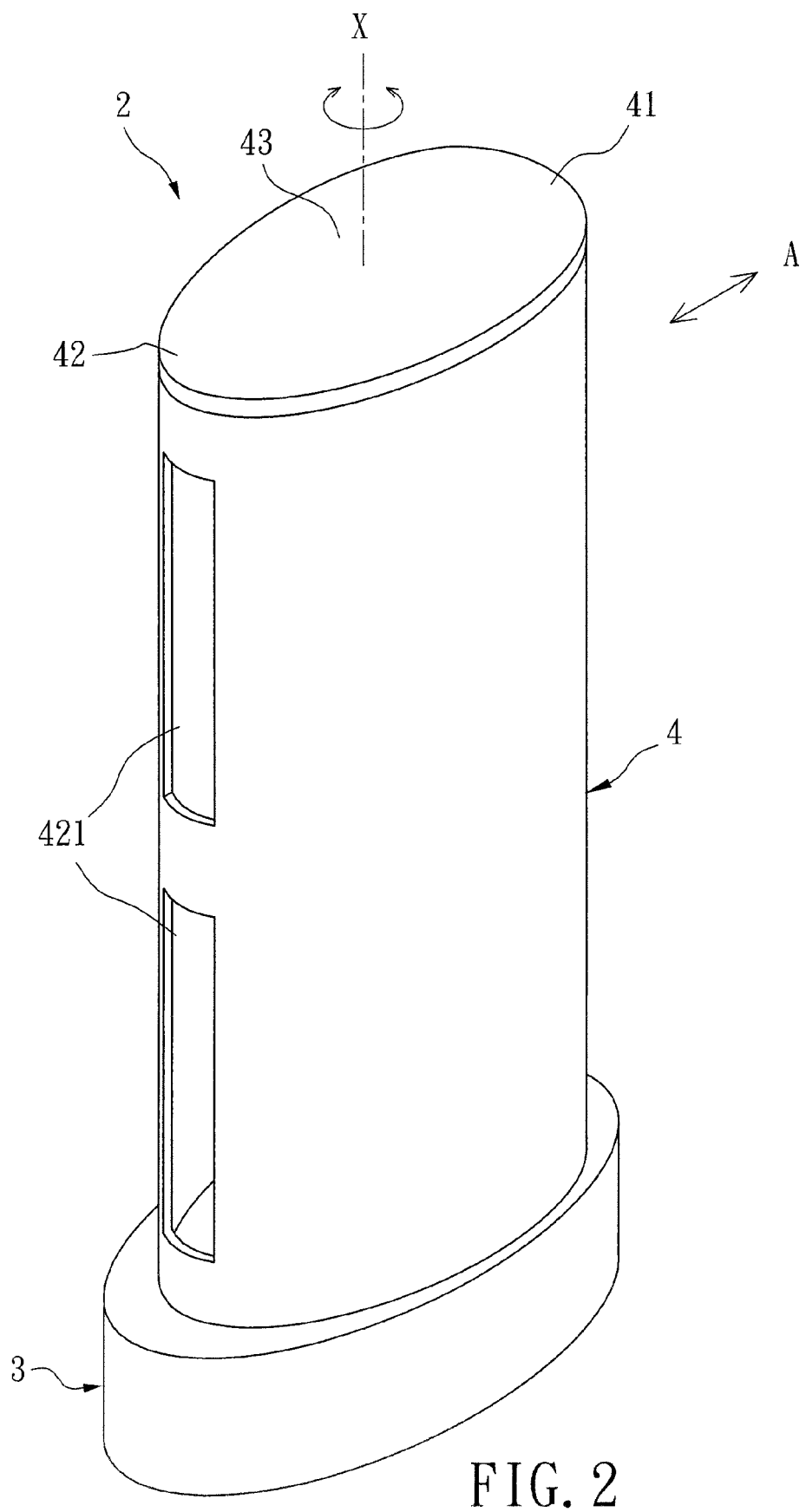
FIG. 2 is a perspective view showing the preferred embodiment of an apparatus for generating electric power using wind energy according to the present invention.
Figure 3:
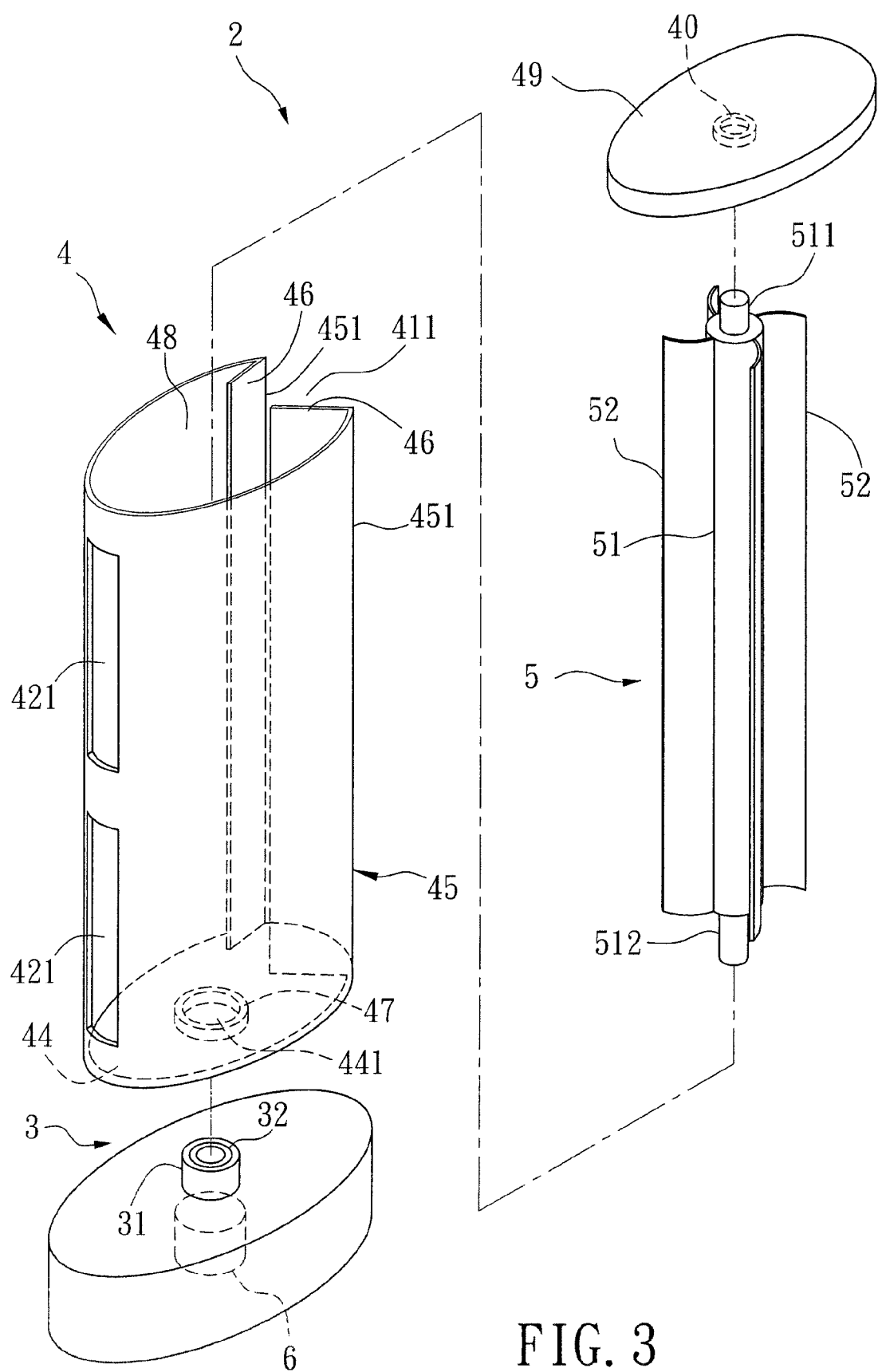
FIG. 3 is a partly exploded perspective view showing the preferred embodiment.
Figure 4:
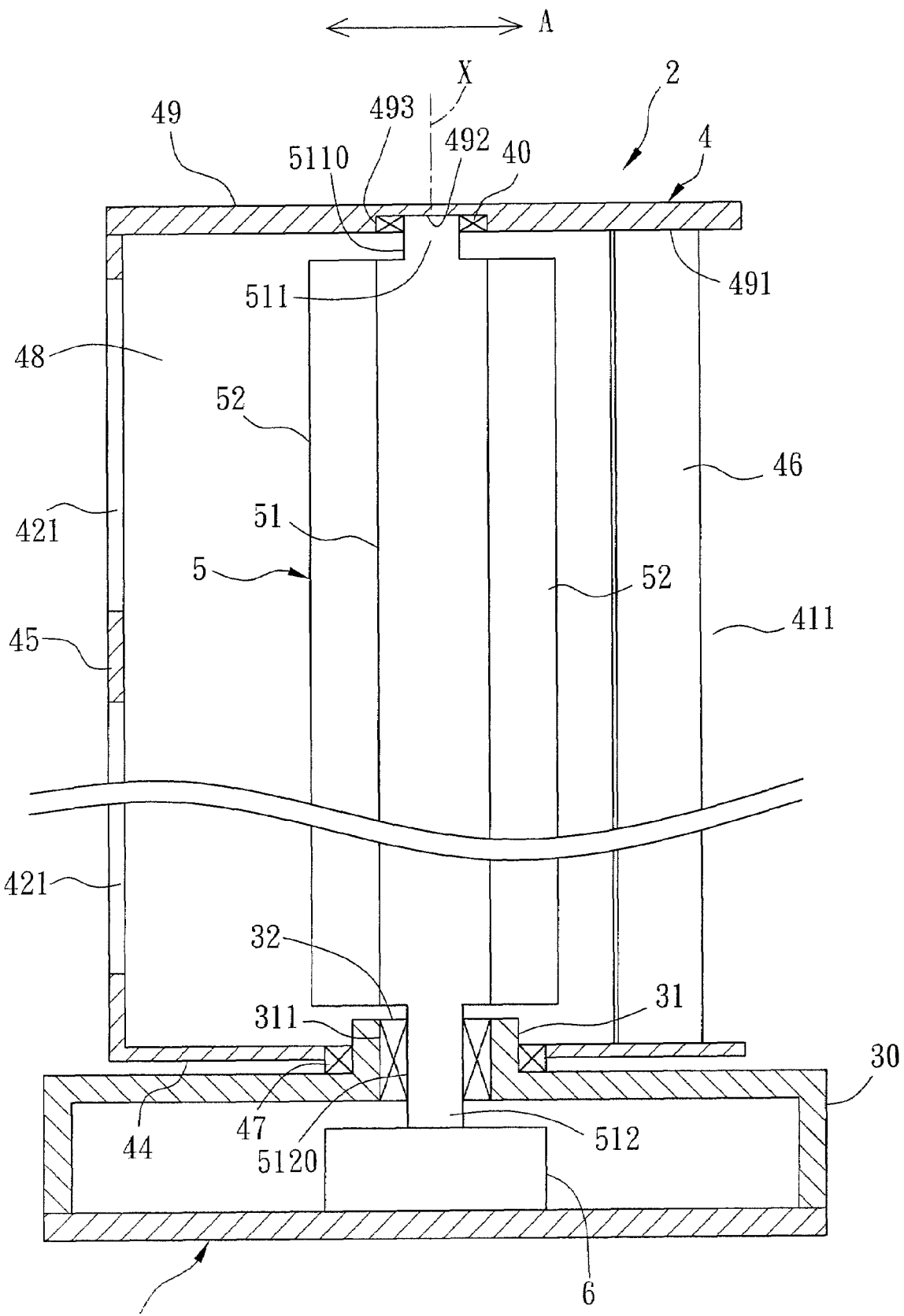
FIG. 4 is a fragmentary schematic sectional view showing the preferred embodiment.

Referring to FIGS. 2 to 4, the preferred embodiment of an apparatus 2 for generating electric power using wind energy according to the present invention is shown to include a base 3, a blade unit 5, a generator 6, and a wind-collecting cover 4.

In this embodiment, the base 3 includes a base body 30, a mounting tube 31 extending upwardly from a top side of the base body 30, and a first bearing 32 disposed in the mounting tube 31.

The blade unit 5 includes an upright rod 51 extending vertically along a pivot axis (X) and having a lower end 512 disposed pivotally in the base 3 and extending through the mounting tube 31 and into the base body 30, and a plurality of upright blades 52 connected fixedly to the upright rod 51 such that the blade unit 5 is rotatable relative to the base 3 about the pivot axis (X) so as to convert wind energy into a mechanical rotary power output. The first bearing 32 is disposed between an outer annular surface 5120 of the lower end 512 of the upright rod 51 and an inner annular surface 311 of the mounting tube 31 of the base 3, as shown in FIG. 4.

The generator 6 is disposed in the base body 30 of the base 3, and is coupled to the lower end 512 of the upright rod 51 of the blade unit 5 to convert the mechanical rotary power output into electric power.

The wind-collecting cover 4 is mounted pivotally on the base 3 for covering the blade unit 5 such that the wind-collecting cover 4 is rotatable relative to the base 3. As shown in FIG. 2, the wind-collecting cover 4 has a first end portion 41 formed with a wind inlet 411, a second end portion 42 opposite to the first end portion 41 in a direction (A) perpendicular to the pivot axis (X) and formed with two wind outlets 421 each having a size smaller than that of the wind inlet 411 in the first end portion 41, and an intermediate portion 43 interconnecting the first and second end portions 41 and 42. It is noted that the wind-collecting cover 4 has a width that decreases gradually from the intermediate portion 43 toward the first and second end portions 41, 42.

In this embodiment, the wind-collecting cover 4 has a bottom wall 44, a top wall 49, and a c-shaped surrounding wall 45 extending vertically between peripheries of the bottom and top walls 44, 49 and cooperating with the bottom and top walls 44, 49 to define an inner space 48 thereamong. The inner space 48 is in spatial communication with the wind inlet 411 and the wind outlets 421. The bottom wall 44 is formed with a through hole 441 defined by an inner annular surface 422 thereof for permitting extension of the lower end 512 of the upright rod 51 of the blade unit 5. The surrounding wall 45 has opposite ends 451 defining the wind inlet 411 therebetween (see FIG. 3), and is formed with the wind outlets 421. The top wall 49 has a bottom surface 491 formed with a positioning groove 492 defined by an inner annular surface 493 of the top wall 49 for permitting extension of the upper end 511 of the upright rod 51 of the blade unit 5 thereinto, as shown in FIG. 4. The wind-collecting cover 4 includes a second bearing 47 disposed between the inner annular surface 442 of the bottom wall 44 and an outer annular surface 311 of the mounting tube 31 of the base 3, and a third bearing 40 disposed between the inner annular surface 493 of the top wall 49 and an outer annular surface 5110 of the upper end 511 of the upright rod 51 of the blade unit 5. It is noted that the wind-collecting cover 4 further has two wind-guiding plates 46 connected fixedly and respectively to the ends 451 of the surrounding wall 45 and extending into the inner space 48 such that an inwardly converging wind-guiding channel 461 is defined between the wind-guiding plates 46.

Figure 5:
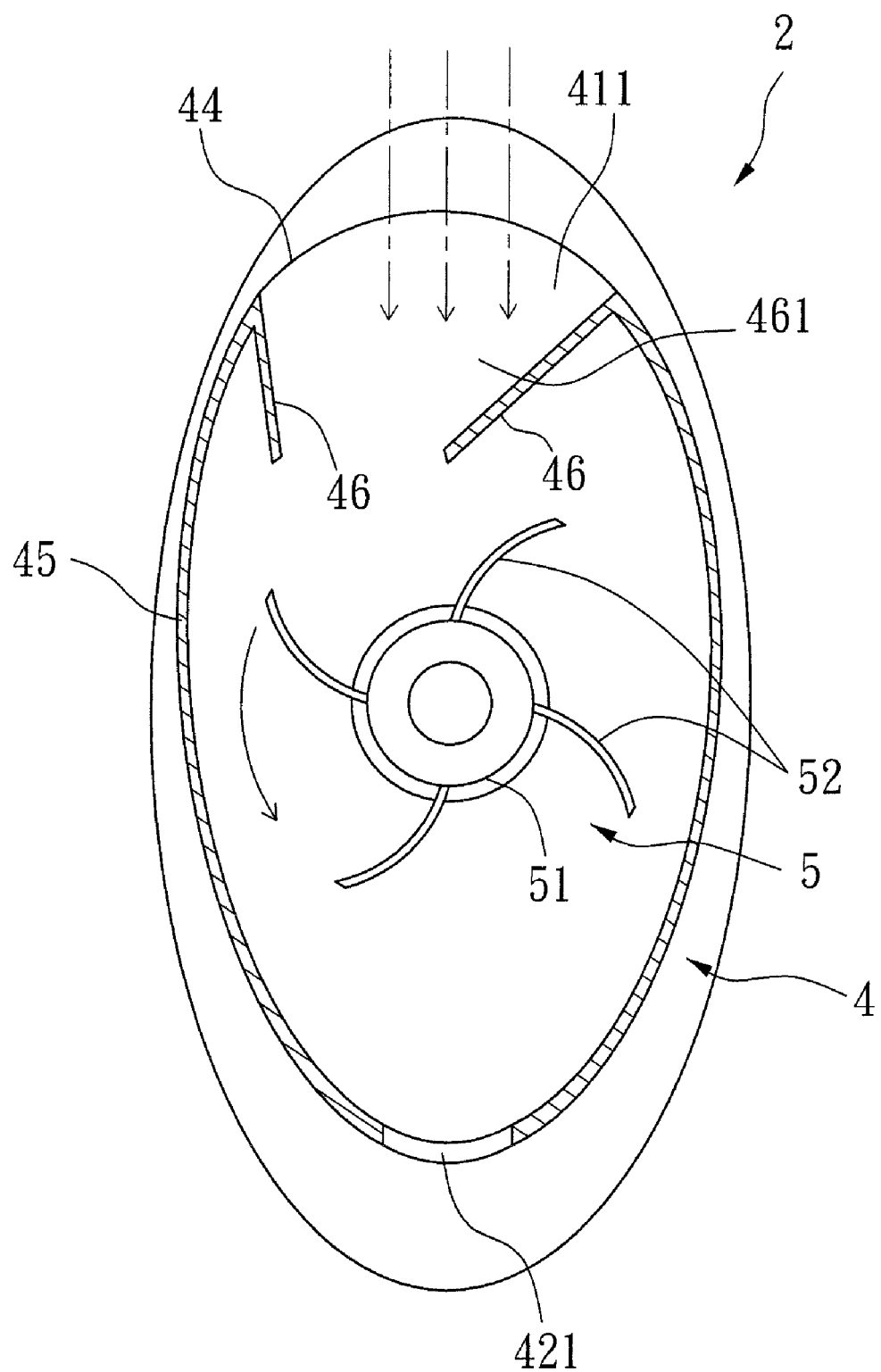
FIG. 5 is a schematic sectional top view showing the preferred embodiment in a state of use.
Figure 6:
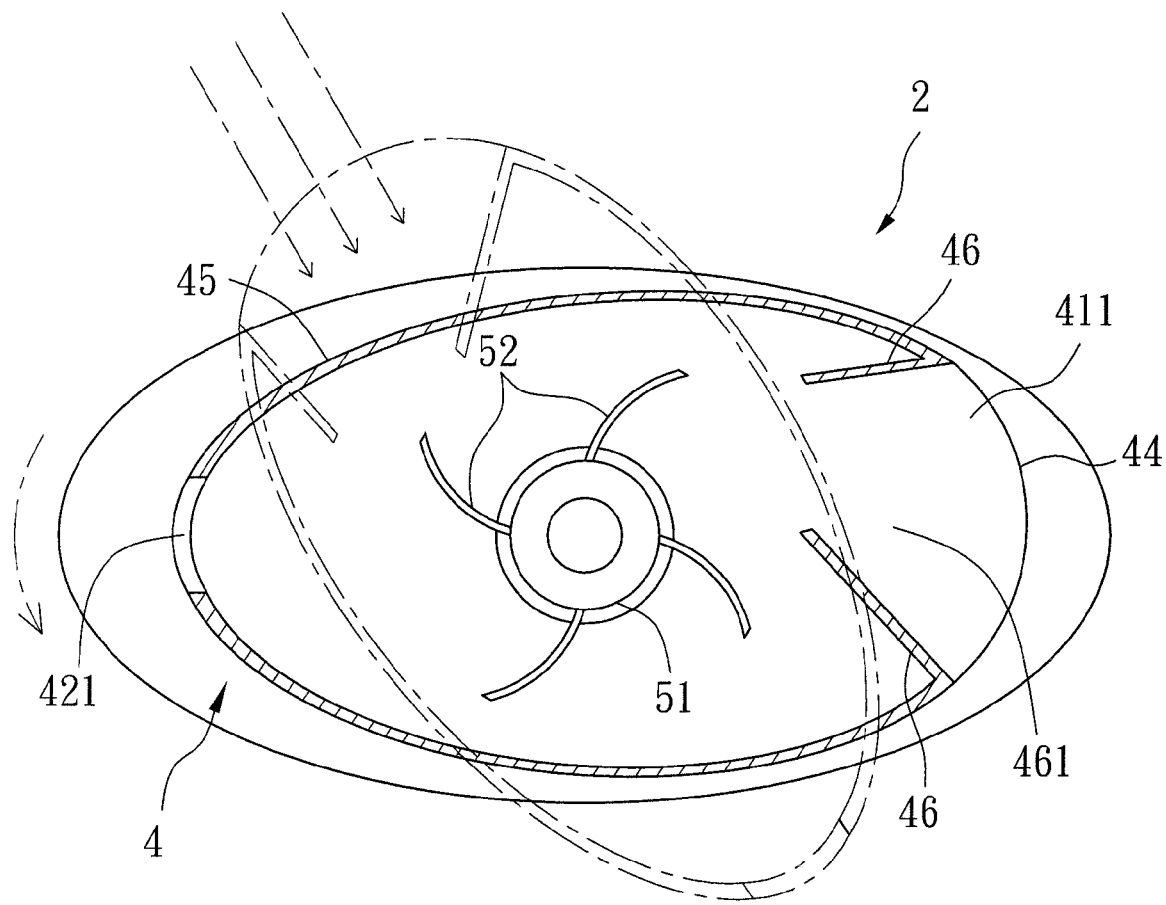
FIGS. 6 and 7 are schematic sectional top views showing the preferred embodiment in another states of use.
Figure 7:
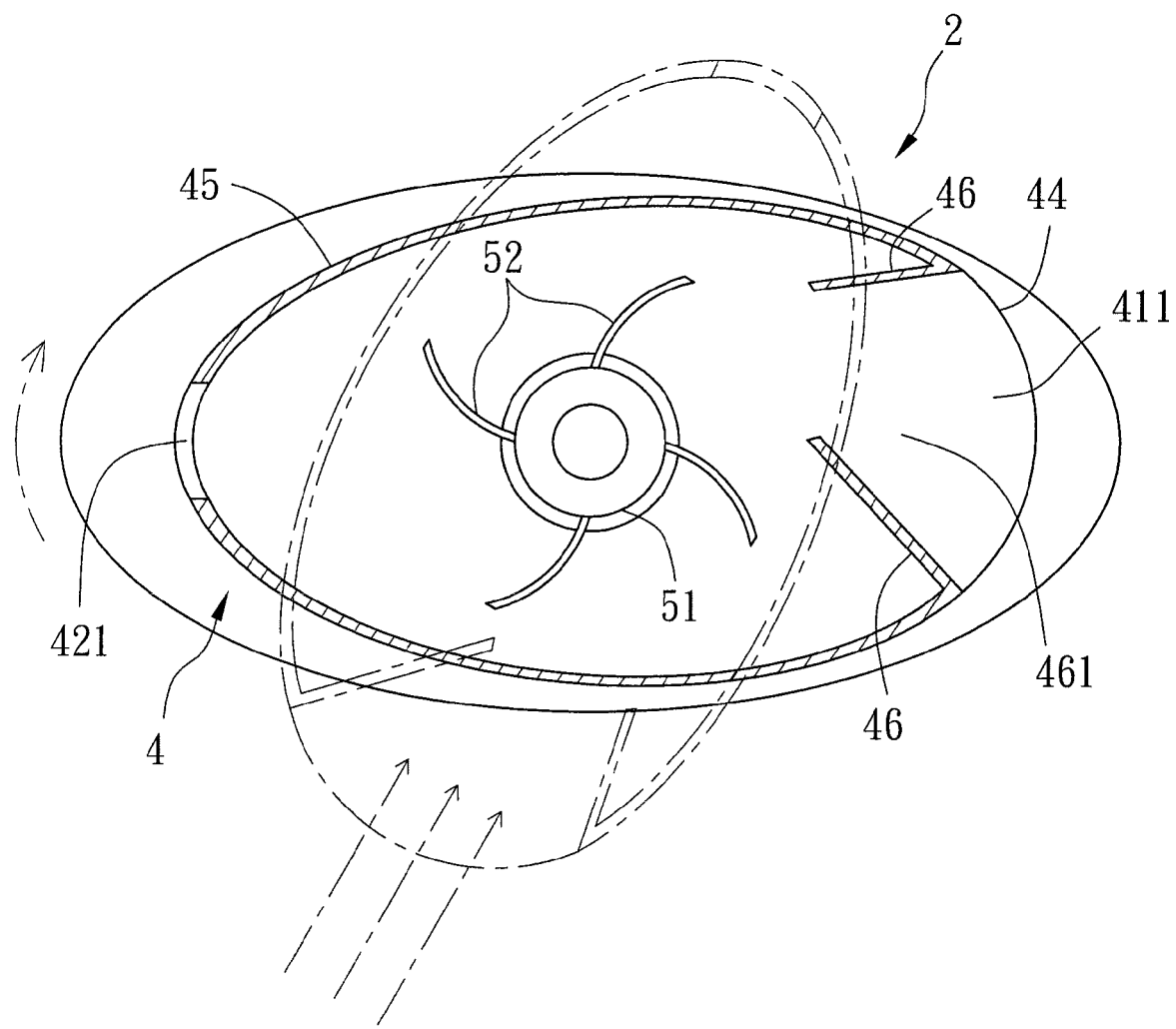

In use, as shown in FIGS. 5 to 7, the wind-collecting cover 4 rotates in response to blowing of wind thereto so that the wind flows into the inner space 48 in the wind-collecting cover 4 via the wind inlet 411 to drive rotation of the blade unit 5 and out of the inner space 48 in the wind-collecting cover 4 via the wind outlets 421. As a result, an orientation of the wind-collecting cover 4 is maintained so that the wind inlet 411 faces toward the wind until the wind direction changes.

In sum, due to the presence of the wind-collecting cover 4, the apparatus 2 of the present invention can ensure stable electric generation even though the wind direction changes, and can be designed to have a relatively small volume. Thus, the apparatus 2 of the present invention is suitable for installation in a densely populated area. Furthermore, an outer surface of the surrounding wall 45 of the wind-collecting cover 5 can be attached with decorative pictures or advertisement pictures thereon.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An apparatus for generating electric power from wind energy, comprising:
   a base;
   a blade unit including an upright rod extending vertically along a pivot axis and having a lower end disposed pivotally in said base, and an upper end, and a plurality of upright blades connected fixedly to the upright rod such that said blade unit is rotatable relative to said base about the pivot axis so as to convert wind energy into a mechanical rotary power output;
   a generator disposed in said base and coupled to said lower end of said upright rod of said blade unit to convert the mechanical rotary power output into electric power; and
   a wind-collecting cover mounted pivotally on said base for covering said blade unit such that said wind-collecting cover is rotatable relative to said base about the pivot axis, said wind-collecting cover being configured with an inner space, and having a first end portion formed with a wind inlet in spatial communication with said inner space, and a second end portion opposite to said first end portion in a direction perpendicular to the pivot axis and formed with a wind outlet in spatial communication with said inner space and having a size smaller than that of said wind inlet in said first end portion;
   wherein said wind-collecting cover rotates in response to blowing of wind thereto so that the wind flows into said inner space in said wind-collecting cover via said wind inlet to drive rotation of said blade unit and out of said inner space in said wind-collecting cover via said wind outlet, and
   wherein said wind-collecting cover further has an intermediate portion interconnecting said first and second end portions, and a width that decreases gradually from said intermediate portion toward said first and second end portions.

2. An apparatus for generating electric power from wind energy, comprising:
   a base;
   a blade unit including an upright rod extending vertically along a pivot axis and having a lower end disposed pivotally in said base, and an upper end, and a plurality of upright blades connected fixedly to the upright rod such that said blade unit is rotatable relative to said base about the pivot axis so as to convert wind energy into a mechanical rotary power output;
   a generator disposed in said base and coupled to said lower end of said upright rod of said blade unit to convert the mechanical rotary power output into electric power; and
   a wind-collecting cover mounted pivotally on said base for covering said blade unit such that said wind-collecting cover is rotatable relative to said base about the pivot axis, said wind-collecting cover being configured with an inner space, and having a first end portion formed with a wind inlet in spatial communication with said inner space, and a second end portion opposite to said first end portion in a direction perpendicular to the pivot axis and formed with a wind outlet in spatial communication with said inner space and having a size smaller than that of said wind inlet in said first end portion;
   wherein said wind-collecting cover rotates in response to blowing of wind thereto so that the wind flows into said inner space in said wind-collecting cover via said wind inlet to drive rotation of said blade unit and out of said inner space in said wind-collecting cover via said wind outlet, and
   wherein said base includes a base body, and a mounting tube extending upwardly from a top side of said base body for permitting extension of said lower end of said upright rod of said blade unit into said base through said mounting tube, and a first bearing disposed between an outer annular surface of said lower end of said upright rod of said blade unit and an inner annular surface of said mounting tube of said base.

3. The apparatus as claimed in claim 2, wherein said wind-collecting cover has a bottom wall, a top wall, and a C-shaped surrounding wall extending vertically between peripheries of said bottom and top walls and cooperating with said bottom and top walls to define said inner space thereamong, said bottom wall of said wind-collecting cover being formed with a through hole for permitting extension of said lower end of said upright rod of said blade unit therethrough, said surrounding wall of said wind-collecting cover having opposite ends defining said wind inlet therebetween, and being formed with said wind outlet, said top wall having a bottom surface formed with a positioning groove for permitting extension of said upper end of said upright rod of said blade unit thereinto.

4. The apparatus as claimed in claim 3, wherein:

said through hole in said bottom wall of said wind-collecting cover is defined by an inner annular surface of said bottom wall;

said positioning groove in said top wall of said wind-collecting cover is defined by an inner annular surface of said top wall; and said wind-collecting cover includes a second bearing disposed between said inner annular surface of said bottom wall and an outer annular surface of said mounting tube of said base, and a third bearing disposed between said inner annular surface of said top wall and an outer annular surface of said upper end of said upright rod of said blade unit.

5. The apparatus as claimed in claim 3, wherein said wind-collecting cover further has two wind-guiding plates connected fixedly and respectively to said ends of said surrounding wall and extending into said inner space such that an inwardly converging wind-guiding channel is defined between said wind-guiding plates.

* * * * *